Feb. 27, 1923.

R. MILLER

DIE BLOCK

Filed Mar. 8, 1920

1,446,626

Witness
Jas. W.

Inventor
Richard Miller
Erwin Wheeler & Wooley
Attorneys

Patented Feb. 27, 1923.

1,446,626

UNITED STATES PATENT OFFICE.

RICHARD MILLER, OF APPLETON, WISCONSIN, ASSIGNOR TO APPLETON WOOD PRODUCTS CO., OF APPLETON, WISCONSIN, A CORPORATION OF WISCONSIN.

DIE BLOCK.

Application filed March 8, 1920. Serial No. 364,341.

*To all whom it may concern:*

Be it known that I, RICHARD MILLER, a citizen of the United States, residing at Appleton, county of Outagamie, and State of Wisconsin, have invented new and useful Improvements in Die Blocks, of which the following is a specification.

This invention relates to wooden die blocks for use in cutting out leather or other sheet material.

One of the objects of this invention is to provide a die block with binding or holding members which may be easily and cheaply constructed and which do not require extensive machining or an extensive working of the parts before they are ready for use.

Other objects of this invention are to provide a die block in which the retaining or binding means utilize members made from standard materials, such as rods, bars or such similar material; to provide die blocks with binding means which allow of ready adjustment to initially compress the block, and which also allow of subsequent automatic adjustment due to warping, shrinking or swelling of the blocks.

In the drawings:

Fig. 2 is a side view thereof and Fig. 3 is a section on the line 3—3 of Fig. 2.

Figure 1:
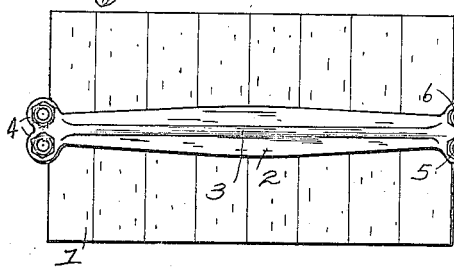
Fig. 1 is an end view of a die block.
Figure 2:
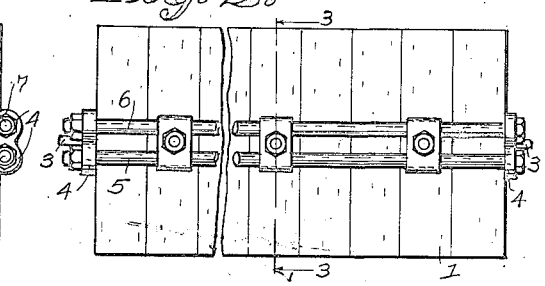
Figure 3:
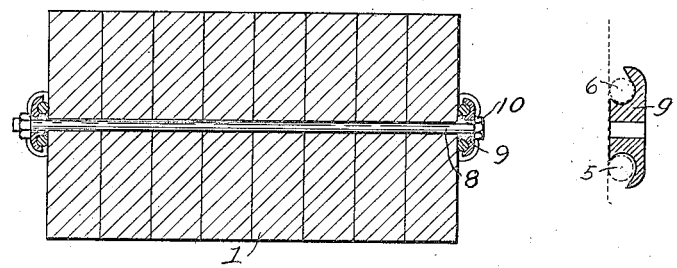

Figs. 1, 2 and 3, showing the first form of die block, will first be described. The die block consists of a plurality of members 1 which may be composed of rectangular wooden blocks with the grain running vertically. These blocks are clamped together by end clamping bars 2 which may have a widened central portion and may be provided upon their outer sides with a longitudinal reenforcing web 3. Ears 4, forming the ends of the clamping bars 2, project beyond the wooden body of the die block. Parallel tie rods 5 and 6 pass through these ears and connect the end clamping bars 2. When the nuts 7, threaded upon these tie rods 5 and 6, are tightened, the clamping bars 2 may be caused to place the blocks 1 under any desired clamping pressure.

At suitable intervals, rods 8 pass transversely through the wooden body of the die block through holes drilled through the blocks 1, three such rods being shown in the drawing but any number may be used as their number depends upon the length of the die block. The rods pass through washers 9 which may be grooved to receive and bear upon the parallel tie rods 5 and 6, thereby forcing such rods against the sides of the blocks and preventing lateral bulging of the die block, when the nuts 10 are tightened. It will be noticed that the holes for the reception of the rods 8 may be drilled at suitable intervals without the necessity of carefully determining their location, as the members 9 may engage the parallel tie rods 5 and 6 at any point in their extent. It will be seen that by widely spacing the tie rods 5 and 6 or 15 and 16 that the blocks may be assembled and clamped in position by the end pieces and tie rods prior to the forming of the transverse holes through the blocks. These transverse holes may be formed by boring through the completed block as there is no danger of the boring tools contacting with the rods due to their relatively wide spacing. Also, subsequent warping, shrinking, or swelling of the blocks does not place dangerous strains upon the binding or holding frame as the members 9 are free to slide upon the tie rods 5 and 6 as occasion demands.

Figure 4:
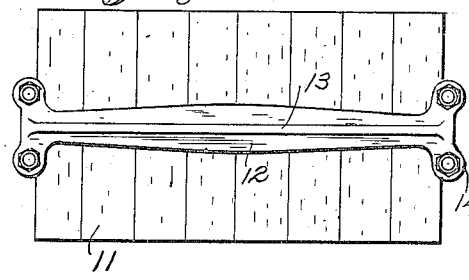
Fig. 4 is an end view of a modified form of die block.
Figure 5:
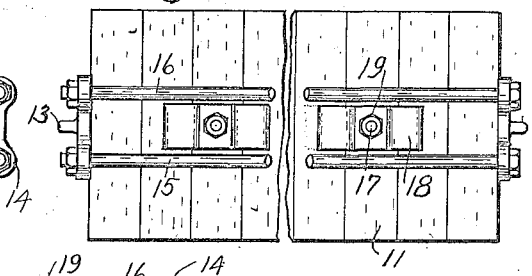
Fig. 5 is a side view of the structure shown in Fig. 4
Figure 6:
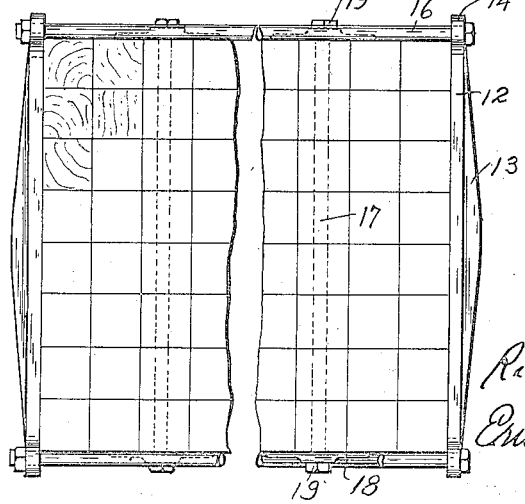
Fig. 6 is a plan view
35 of the structure shown in Fig. 4.

Figs. 4, 5 and 6 showing the modified form of the invention, will now be described. The body of the die block is formed of a plurality of wooden blocks, similar to the blocks 1 of the first form of the invention. The end clamping members 12 may be provided with a reenforcing rib 13 and provided with projecting ears 14 as in the other form. However, the upper and lower ears 14 are spaced farther apart so as to receive relatively widely spaced tie rods 15 and 16. At suitable intervals rods 17 extend laterally through the body of the die block, through holes drilled through the blocks 11, one such rod being shown in the drawing, although any number may be employed. These rods pass through elongated washers 18 which press directly against the wooden body of the die block when the nuts 19 are tightened. By having the relatively wide spacing of the rods 15 and 16 sufficient room is allowed for the washers 18. These washers may be made relatively thick at their central portion and may become thinner at their ends, and may be of sufficient length to span a plurality of adjacent blocks 11.

This invention provides end clamping members of such design that they may be readily cast or otherwise cheaply formed which, coupled with the use of ordinary rods threaded at each end, materially lessens the cost of the production of the blocks.

It will be noticed that a plurality of rods and a plurality of nuts carry the longitudinal strains and that a sturdy design of end clamping members is secured by this invention.

Longitudinal shifting of the rods 8 and 17 is permitted as the washers, or side bearing members, are unconstrained and may assume any position relative to the longitudinal tie rods, the members 9 slipping along the rods 5 and 6 and the members 18 slipping along the sides of the blocks.

I claim:

1. A die block comprising a body formed of a plurality of independent blocks, ribbed clamping members bearing upon the ends of the body, and a plurality of tie rods located upon each side of the body for operatively connecting the end clamping members.

2. A die block comprising a body formed of a plurality of separate blocks, clamping members at each end of said body, a pair of independently adjustable tie rods located upon each side of said body for drawing the end clamping members towards each other, an intermediate transverse clamping rod, and clamping devices at the end of said transverse rod.

3. A die block comprising a body formed of a plurality of separate blocks, clamping members at each end of said body, a pair of tie rods upon each side of said body for drawing the end clamping members towards each other, an intermediate transverse clamping rod, and clamping devices at the ends of said transverse rod adapted to engage said tie rods.

In testimony whereof I affix my signature in the presence of two witnesses.

RICHARD MILLER.

Witnesses:
LEVERETT C. WHEELER.
O. C. WEBER.